UNITED STATES PATENT OFFICE.

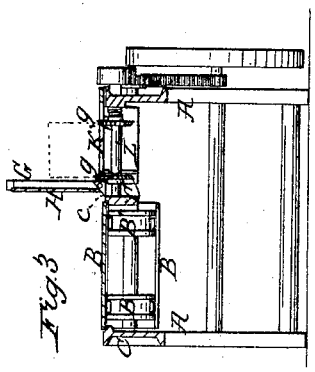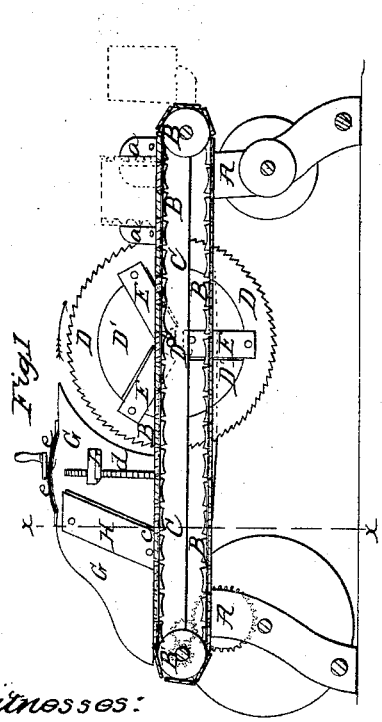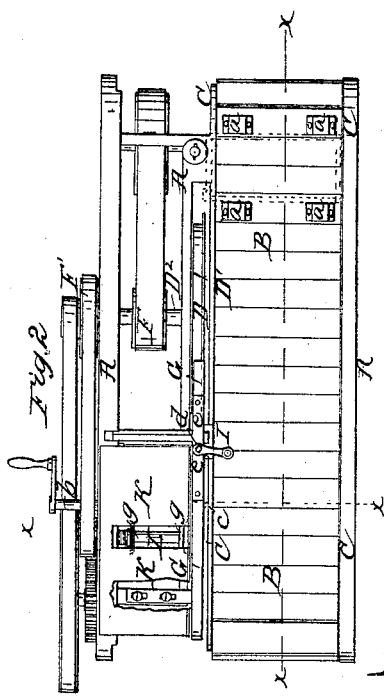

H. A. JONES, OF ST. LOUIS, MISSOURI, ASSIGNOR TO EDMUND H. DEWEY, OF SAME PLACE.

MACHINE FOR FINISHING WOODEN BOXES.

Specification of Letters Patent No. 28,038, dated April 24, 1860.

*To all whom it may concern:*

Be it known that I, HENRY A. JONES, of St. Louis, in the State of Missouri, have invented certain new and useful Improvements in Machinery for Smoothing, Chamfering, and Finishing Packing-Boxes; and I do hereby declare that the following is a full, clear, and exact description thereof, reference being had to the accompanying drawings, forming a part of this specification, in which—

Figure 1, represents a side elevation of my machine, showing a longitudinal vertical section taken through the traveling table for moving the box up to and from the cutters. Fig. 2, is a plan view of Fig. 1. Fig. 3, is a vertical transverse section through the machine as indicated by the red lines $x$, $x$, of Fig. 2, this figure shows the cutters for chamfering the corners or edges of the boxes.

Similar letters of reference indicate corresponding parts in the three figures.

The object of this invention, as the title implies is to smooth off the surfaces of boxes, cut off the projecting ends of the boards at the corners of the box, so that after it has passed through the machine for doing this, it will be finished and ready for the market.

My invention consists in the employment of a traveling carriage to which the work is clamped in a novel manner; and while in this confined state it is brought up to a circular saw and cutter combined, having a rotary motion, where the roughness and projecting portions of the box are taken off, from this it is brought between two chamfering knives, one of which is adjustable to the size of the box and held down by a suitable spring so as to adapt itself to the edge of the box, should the edge not be parallel with the bed of the table; the box then passes a fixed smoothing knife which is inclined so as to give a draw cut. This operation finishes one side of the box and chamfers off two corners or edges; and should it be necessary to finish off each side of the box it must pass through the same operation for each surface, if not the box is removed to the opposite side of the machine, and passed over beveled cutters, which chamfer its corners or edges as the final operation, all of which will be hereinafter described and represented.

To enable those skilled in the art to fully understand my invention I will proceed to describe its construction and operation.

In the drawings A, represents the framing of the machine which is a table of a suitable height, length and width. On one side of this table is arranged a traveling apron B, which is made up of slats and bands, connected by links and moved by means of two rollers B′, placed at each end of the table A, which receive their motion from the prime mover of the machine through the medium of suitable gearing. This endless apron B, moves between two guide bars or rails C, C, and the surface of the apron should be level with the surface of the rails, $a$, $a$, $a$, $a$, are clamping jaws secured to the slats of which the apron is composed, and placed at suitable distances apart, and so that their inner surfaces will be parallel with the slats or at right angles with the saw D. These jaws $a$ may be made so as to be set at different distances apart for the various sized boxes, and one, two, or more sets may be used if necessary.

D′, is a saw and cutter head, to which is secured the saw-ring D, presenting on the sides toward the apron B, a flat surface, the saw being set into the plate the distance of its thickness, so as to be flush with the surface of the head D′, E, E, E, are three knives, radiating from the axis of the cutter-head shaft D², and secured to said head so that their cutting edges may be adjusted and set for making any desired cut, and behind these edges in the cutter head, are slots for allowing a free escape of the shavings. On this cutter head shaft are pulleys F, F′, over which belts pass and communicate with the prime mover.

G is a curved adjustable guide-plate adjusted by a shaft $b$, so that it can be made to approach or recede from the box placed on the apron, the inner surface of the plate G, is kept on a parallel plane with the inner surface of the saw head D′, this plate should further be acted upon by a spring which will keep it up to the box. It carries three separate knives H, I and $c$, the knife H is inclined forward and extends from the bottom to the top of the plate G, it is for the purpose of smoothing and finally finishing the surface of the box; a throat behind its cutting edge in plate G, allows the shavings, &c., to escape freely. In the foot of this knife and close to its edge is a small knife $c$, the edge of which projects from the face of plate G, a suitable distance and this edge is set at about an angle of 45°. The knife is fixed, and serves to cut or chamfer the lower edge of the box while it is passing. The upper edge of the box is chamfered by an adjustable knife I, which can be raised or depressed by a vertical set screw $d$, according to the size of the box to be operated upon. This knife is further acted upon by a spring $e$, which has a tendency to keep it down on the edge of the box, and at the same time allow the knife to adapt itself to the uneven edge of the box; this knife is also set at such an angle with respect to the box that the edge will be properly beveled off. On the opposite side of the guide plate G, is a table K, under which is arranged two beveled rotary chamfering cutters $g, g$, Figs. 2 and 3, the one next the plate G, is keyed to its shaft L, but the other should have a spring behind it, by which it will adapt itself to the variation in the size of boxes, the shaft of these cutters will be driven by a belt connected with the pulley on main saw shaft.

The operation of the machine thus described may be briefly stated as follows. The rough boxes are placed between the jaws or bracket pieces $a$, at the end of the traveling apron B, when they are in the positions shown by red lines Fig. 1, and two of the jaws lie in a horizontal position, as the apron moves onward, these two jaws are brought in a vertical position and the box is held fast to the apron and moves along with it up to the saw which turns in the direction indicated by the arrows Fig. 1. After the saw D, and cutters E, perform their work of cutting off the projections from one side of the box, and partially smoothing this side, the box passes to the chamfering cutters I and $c$, then it receives its final smoothing, from the inclined smoothing iron H, when it is discharged from the end of the apron as the jaws $a$ pass around the apron roller B. The box is then passed over the table K, and the corners left by the first cutters are chamfered by the rotary cutters $g, g$.

Having thus described my invention, what I claim and desire to secure by Letters Patent, is—

1. The endless traveling apron B, with clamping jaws $a, a, a, a$, arranged and operating as set forth with relation to the rotary saw, and cutter head D, D', E, the whole operating in the manner and for the purpose herein specified.

2. The adjustable guide plate G, carrying chamfering cutters I, $c$, and smoothing cutter H, as shown and described.

3. The beveled chamfering cutters $g, g$, arranged with relation to the traveling apron B, and guide plate G, as set forth and for the purposes described.

HENRY A. JONES.

Witnesses:
  WM. WHITE,
  GEO. A. GODFREY.